United States Patent [19]

Mandrin et al.

[11] 3,978,663
[45] Sept. 7, 1976

[54] PROCESS AND APPARATUS FOR EVAPORATING AND HEATING LIQUIFIED NATURAL GAS

[75] Inventors: Charles Mandrin, Winterthur; Mehmet Sahabettin Ergenc, Zollikerberg/ZH, both of Switzerland

[73] Assignee: Sulzer Brothers Limited, Winterthur, Switzerland

[22] Filed: Jan. 9, 1975

[21] Appl. No.: 539,653

[30] Foreign Application Priority Data
Jan. 11, 1974  Switzerland.......................... 333/74

[52] U.S. Cl............................... 60/39.67; 60/39.02; 62/52
[51] Int. Cl.²........................ F02C 7/16; F02C 7/12
[58] Field of Search............ 60/39.02, 39.67, 39.33; 62/7, 52

[56] References Cited
UNITED STATES PATENTS

| | | | |
|---|---|---|---|
| 3,183,666 | 5/1965 | Jackson | 62/52 |
| 3,288,066 | 1/1974 | Nebgen | 60/39.05 |
| 3,438,216 | 4/1969 | Smith | 62/52 |
| 3,621,656 | 11/1971 | Pacault | 60/39.02 |
| 3,720,057 | 3/1973 | Arenson | 60/39.02 |
| 3,796,045 | 3/1974 | Foster-Pegg | 60/39.18 B |
| 3,867,811 | 2/1975 | Waeselynk | 62/52 |

*Primary Examiner*—Carlton R. Croyle
*Assistant Examiner*—L. J. Casaregola
*Attorney, Agent, or Firm*—Kenyon & Kenyon Reilly Carr & Chapin

[57] ABSTRACT

The liquified natural gas is passed in heat exchange relation with a flow of air in order to use the heat energy in the air to heat and vaporize the liquified natural gas. The resulting cooled air is then used as the input to an open gas turbine plant. This, in turn, increases the efficiency of the turbine plant and an overall conservation of energy effect is produced. In order to avoid freezing of any water vapor in the air, a medium having a lower freezing point than water is mixed into the air flow prior to heat exchange.

5 Claims, 1 Drawing Figure

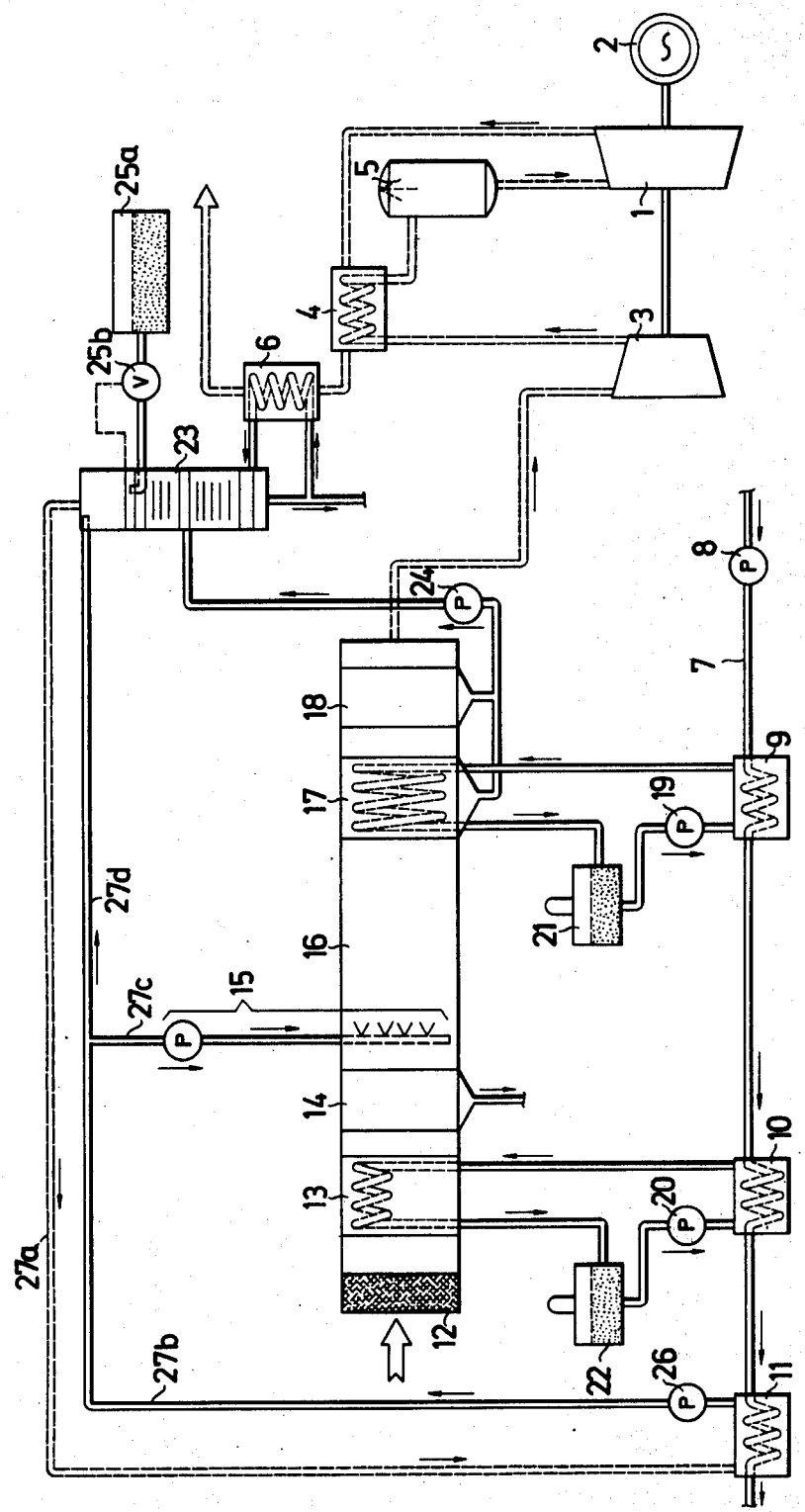

PROCESS AND APPARATUS FOR EVAPORATING AND HEATING LIQUIFIED NATURAL GAS

This invention relates to a process and apparatus for evaporating and heating liquified natural gas.

As is known, energy is required in order to liquify gas. Also, it is known that natural gas is usually liquified where obtained in order to be transported and subsequently vaporized at a destination point for distribution to various consumers. Generally, the liquified natural gas is evaporated and heated at the destination point in a heat exchanger to which heat is supplied at approximately the surrounding temperature. Various heating media such as seawater, river water or air have been used for this purpose. However, there has been no recovery of the energy used to liquify the gas at the site where obtained.

Accordingly, it is an object of this invention to recover the energy used to liquify gases less, of course, inevitable losses.

It is another object of the invention to simplify the control of the air supplied to an open gas turbine plant.

It is another object of the invention to provide an economical system for supplying cooled air to an open gas turbine plant.

Briefly, the invention provides a process wherein a liquified natural gas is passed in heat exchange relation with a flow of air which is directed to an open gas turbine plant. During the process, heat is absorbed from the air to cool the air and supplied to the liquified natural gas to heat and vaporize the liquified gas. The cooled air then enters the turbine plant while the vaporized natural gas is supplied to a consumer. Because the temperature of the air entering the turbine plant, and particularly a compressor of the plant, is reduced, the efficiency of the gas-turbine plant, and thus the useful power with the same consumption of fuel can be substantially increased in comparison with open gas-turbine plants with which the air is inducted at ambient, i.e. the surrounding temperature.

Further, since the air flow may contain atmospheric moisture, the process includes a step of mixing a medium having a lower freezing point than water into the air flow prior to heat exchange. In this way, the surfaces of the heat-exchanger or heat-exchangers used in the process are not subjected to the formation of ice i.e. icing.

In accordance with the process, the heat-energy of the flow of air, needed for the vaporization and heating and conducted to the open gas-turbine plant, is withdrawn through heat-exchange in a cooling process while freezing of the water separated out of the supplied flow of air is prevented by the mixing of a medium having a lower freezing point than that of the water with the air flow. This latter feature causes the freezing point of the mixture consisting of separated-out water and medium to be below that of the prevailing temperature of the air-side surfaces of the heat-exchanger serving for the heat exchange.

The invention also provides the combination of an open gas-turbine plant for receiving a flow of air and at least one heat-exchange system for cooling the flow of air while absorbing heat, which heat is given to the liquified natural gas for vaporizing and heating the liquified gas. In addition, a means for mixing in a medium into the flow of air ahead of the heat-exchange system is provided for lowering the freezing point of the separated-out water.

This invention avoids the need to have reversible heat exchangers or driers connected in parallel to effect the cooling of the inducted air. Since such heat exchangers or driers usually require recharging in alternating fashion at various periods of time, several disadvantages are eliminated. For example, these arrangements usually have great thermodynamic losses under certain conditions. Also, these arrangements require an expensive control system in order to guarantee uniform entry conditions at all times for the temperature, pressure and throughput quantities for the compressor of the gas turbine plant.

The medium which is mixed into the air flow is advantageously methanol ($CH_3 CH$) and this namely in liquid form, because methanol has a substantially higher partial pressure than water-vapor. Thus, methanol, after the mixing together, evaporates for the greater part, while at the same time the water-vapor for the greater part condenses.

Ethanol ($C_2H_5OH$) likewise represents an advantageous medium to be mixed into the air flow. In any case, the required quantity of medium to be mixed in so as to obtain a desired lowering of the freezing point of the solution may be determined by the aid of the familiar vapor-, liquid- and equilibrium curves for aqueous solutions.

Under certain circumstances, it may also be advantageous to introduce the medium not in liquid form but in vapor form. In that case, the operating conditions may be chosen so that no lowering of the temperature occurs during the mixing operation and thus no formation of mist occurs.

An especially advantageous further development of the invention consists in recovering the medium which is mixed into the air-flow through rectification out of the solution yielded as a liquid during heat-exchange.

A further advantageous development of the invention consists in that the heat exchange is effected by the aid of at least one coolant, e.g. by means of a freon, such as $CF_2 Cl_2$ or $CH F_2 Cl$.

The use of a separate coolant allows the coolant to be kept at a lower pressure than the pressure of the natural gas specified by the gas-network. This lower pressure permits economical construction of the heat-exchanger or heat-exchangers installed in the flow of air. It is also possible, through suitable regulation of the quantity of the coolant to more precisely control the temperature of the inducted air in the cooling process.

These and other objects and advantages of the invention will become more apparent from the following detailed description and appended claims taken in conjunction with the accompanying drawing in which:

The drawing schematically illustrates an apparatus for carrying out the process of the invention in which liquid methanol is used for mixing into the air flow.

As illustrated, the open gas-turbine plant consists of a gas-turbine 1 which drives a generator 2, of a compressor 3, of a heat-exchanger 4 and of a combustion-chamber 5.

Liquid natural gas is pumped from a suitable source (not shown) through a conduit 7 via a pump 8 and sequentially through heat exchangers 9, 10, 11. During passage through the heat exchangers 9, 10, 11 the natural gas is heated to approximately the surrounding temperature and then discharged to a consumer via a distributing network (not shown).

A duct for supplying air to the compressor 3 of the turbine plant houses a filter 12 at the upstream end relative to the air flow, a pre-cooler 13, a water-separator 14 of known type, a mixing means 15 including injection nozzles and a pump, a mixing chamber 16, at least one heat exchanger 17 and a water-separator 18.

The heat exchanger 17 is incorporated in a heat exchange system which operates to absorb heat from the flow of air to cool the flow of air and to supply heat to the flow of liquified natural gas to heat and vaporize the gas. To this end, the heat exchange system also includes the heat exchanger 9, a supply of coolant and a pump 19 for circulating the coolant through the heat exchangers 9, 17 which are suitably connected. A supply tank 21 is also provided in the heat exchange system to adjust to the desired throughputs, and thus, the temperature regulation of the air flow. For sake of simplicity, the corresponding quantity regulators in the circuit are not shown.

In a similar fashion, the pre-cooler 13 which is in the form of a heat exchanger is part of a second heat exchange system for pre-cooling the air flow. This system includes the heat exchanger 10, a pump 20 and a supply tank of coolant.

In both heat exchange systems, the coolant which may be $CF_2 CL_2$ or $CH F_2Cl$ is recycled in a closed circuit.

The mixing means 15 serves to mix a medium for lowering the freezing point of the separated out water into the flow of air downstream of the water separator 14 and upstream of the heat exchanger 17. The medium mixed into the air flow, for example, methanol is in liquid form.

In addition to the mixing means 15, a rectification column 23 is connected via a conduit to the air flow duct for receiving a flow of a mixture of the methanol and any separated water in order to the methanol. As shown, the rectification column 23 is connected to the cooling space of the heat exchanger 17 and the water-separator 18 and the mixture is pumped via a pump 24. An evaporator 6 is also connected to the bottom part of the column 23 and is heated by the exhaust gas from the gas turbine plant. A reserve supply tank 25a of methanol is connected to the column 23 via a level regulator and contains methanol to make-up methanol losses.

A system of conduits 27a, 27b, 27d connects the top of the rectification column 23 with the downstream heat exchanger 11 which acts as a condensor for the methanol. This system has a pump 26 for pumping the liquid methanol back to the column 23 as well as to the mixing means 15 via a branch conduit 27c.

In operation, air containing water-vapor is sucked in from the atmosphere by the compressor 3, passes through the filter 12 to remove solid impurities, and is then pre-cooled in the heat-exchanger 13 through heat exchange with the coolant cooled in the heat-exchanger 10.

The drops of water condensed out during the pre-cooling are separated from the flow of air in the water-separator 14. Then liquid methanol is injected through the nozzles of the mixing means 15 into the flow of air.

As has already been explained above, a mixture of air, methanol and water-vapor becomes produced.

Because of the higher partial-pressure, the methanol for the greater part, becomes evaporated in the mixing chamber 16, whereby at the same time water-vapor condenses, and in addition a further cooling of this mixture is effected.

The mixture now becomes further cooled in the main heat exchanger 17, through heat transfer from the coolant flowing through the heat-exchanger 9 and is cooled further to the temperature of the air entering the compressor 3. The water condensed out of the mixture contains methanol and has a lower freezing point than the temperature of the air-side surfaces of the main heat exchanger 17. Thus, the water contained in the solution cannot freeze at the surface of the main heat exchanger 17, so that, on the one hand, the heat-exchange between flow of air and the coolant does not become impaired and, on the other hand, the heat-exchanger 17 does not become plugged up by ice forming. A continuous operation of the gas turbine is thereby ensured along with continuous heating and vaporization of the natural gas.

From the heat exchanger 17 and the water-separator 18, the solution of water and methanol is fed into the rectification column 23, and the methanol is separated from the water. The water is extracted from the bottom of the column 23 and discarded, while the methanol, in the form of vapor, is conducted out of the top of the column 23 through the conduit 27a, and conveyed into the heat exchanger-condenser 11.

A part of the condensate is conveyed back into the cooling process for the air by the mixing means 15 while the remainder is fed back as a return flow into the column 23 through the conduit 27d.

What is claimed is:

1. In combination,
an open gas turbine plant for receiving a flow of air;
a conduit for conducting a flow of liquified natural gas;
a first heat exchange system for absorbing heat from the flow of air to pre-cool the flow of air upstream of said plant and for supplying heat to the flow of liquified natural gas to heat and vaporize the flow of liquified natural gas;
a water separator downstream of said first heat exchange system for separating water from the flow of air;
means for mixing a medium having a lower freezing point than water into the flow of air downstream of said heat exchange system;
a second heat exchange system in the path of flow of the air downstream of said mixing means for cooling the flow of air and for supplying heat to the flow of liquified natural gas;
a second water separator downstream of said second heat exchange system for separating a mixture of the medium and water from the flow of air; and
a rectification column connected to said second heat exchange system and said second water separator for receiving the mixture of medium and water to separate the water from the medium and to recover the medium.

2. The combination as set forth in claim 1 wherein the medium is methanol.

3. The combination as set forth in claim 1 wherein the medium is ethanol.

4. The combination as set forth in claim 1 which further includes a heat exchanger disposed in the flow of liquified natural gas, said heat exchanger being connected to said rectification column for receiving the recovered medium therefrom in vapor form for heat exchange with the liquified natural gas and to return the medium in liquified form to said rectification column and to said mixing means.

5. The combination as set forth in claim 1 which further includes an evaporator connected to the bottom of said rectification column to receive a flow of water therefrom, said evaporator being connected to said open gas turbine plant to receive a flow of exhaust gas therefrom for heating the water from said column.

* * * * *